United States Patent [19]

Montemurro

[11] Patent Number: 5,170,097
[45] Date of Patent: Dec. 8, 1992

[54] INTERMITTENT WINDSHIELD WIPER AND HEADLIGHT CONTROL

[76] Inventor: Vincent Montemurro, 944 N. Queens Ave., Linderhurst, N.Y. 11757

[21] Appl. No.: 672,572

[22] Filed: Mar. 20, 1991

[51] Int. Cl.⁵ .............................................. B60Q 1/02
[52] U.S. Cl. ........................................ 315/83; 315/82; 307/10.8
[58] Field of Search ................... 315/82, 83; 307/10.8, 307/10 LS, 10.1; 318/443

[56] References Cited

U.S. PATENT DOCUMENTS

| | | | |
|---|---|---|---|
| 3,500,119 | 3/1970 | Price | 315/82 |
| 3,591,845 | 7/1971 | Vanderpoel, Jr. | 315/82 |
| 4,010,380 | 3/1977 | Bailer et al. | 315/82 |
| 4,236,099 | 11/1980 | Rosenblum | 315/83 |
| 4,625,157 | 11/1986 | Phillimore | 318/443 |
| 4,956,562 | 9/1990 | Benedict et al. | 315/83 |
| 4,985,660 | 1/1991 | Cronk | 315/82 |

FOREIGN PATENT DOCUMENTS

| | | | |
|---|---|---|---|
| 2039173 | 7/1980 | United Kingdom | 307/101 S |
| 2130030 | 5/1984 | United Kingdom | 315/83 |

Primary Examiner—Eugene R. LaRoche
Assistant Examiner—Son Dinh
Attorney, Agent, or Firm—John B. Dickman, III

[57] ABSTRACT

An automatic driving lights circuit for a vehicle electrical system in response to the operation of a windshield wiper motor. The driving lights circuit operates independently of the headlights switch to turn on and off the driving lights each time the wiper motor is turned on and off. Additionally, the circuit continually operates the driving lights when the wiper is operating intermittently.

6 Claims, 1 Drawing Sheet

INTERMITTENT WINDSHIELD WIPER AND HEADLIGHT CONTROL

BACKGROUND OF THE INVENTION

The present invention relates to an for turning on the driving lights of an automobile when the windshield wiper is operated, and, in particular, an automatic circuit for turning on the driving lights and operating them even when the wiper is in intermittent mode.

Currently, there are four states which require the low beam headlights of motor vehicles to be turned on during daylight rain as a safety precaution, so that the motorist may better see oncoming vehicles. The problem is that most motorist either do not understand the purpose of the law, or fail to turn on the lights. What also happens is that after turning the lights on, the motorist forgets to turn off the lights when the vehicle is parked.

There have been various safety devices on the market for automatically turning on headlights when the windshield wipers are turned on. U.S. Pat. No. 3,500,119, issued to Price discloses a relay switching system responsive to the operation of the wiper motor, the ignition switch, and headlight dimmer switch for controlling the energization of the low beam headlights and tail lights. There are other safety devices and circuits which automatically turn off headlights when the ignition is turned off. None of these devices solve the problem of turning on low beam headlights when the wiper switch is turned to intermittent action. The problem is in the intermittent mode where the wiper motor timer pulses "on" and "off" and the electric current to the headlights is similarly disrupted. The present invention solves the problem by providing a circuitry system that supplies continuous current to the driving lights during the operation of the wiper timer.

SUMMARY OF THE INVENTION

The invention relates to an electrical circuit for turning on vehicle driving lights when the wiper switch is turned on, turning the lights off when the wiper switch is shut off, and making it possible to operate the driving lights when the wipers are operated intermittently.

A primary object of the invention is to provide a safety switching circuit for turning on vehicle lights in response to a windshield wiper switch activation.

Another object of the invention is to provide a safety switching circuit for turning on the vehicle driving lights during daylight driving through rain which is inexpensive to manufacture, dependable and easily installed as an integral part of a vehicle lighting and ignition system accessory or incorporated in the vehicle as original equipment.

DESCRIPTION OF THE INVENTION

Figure 1:
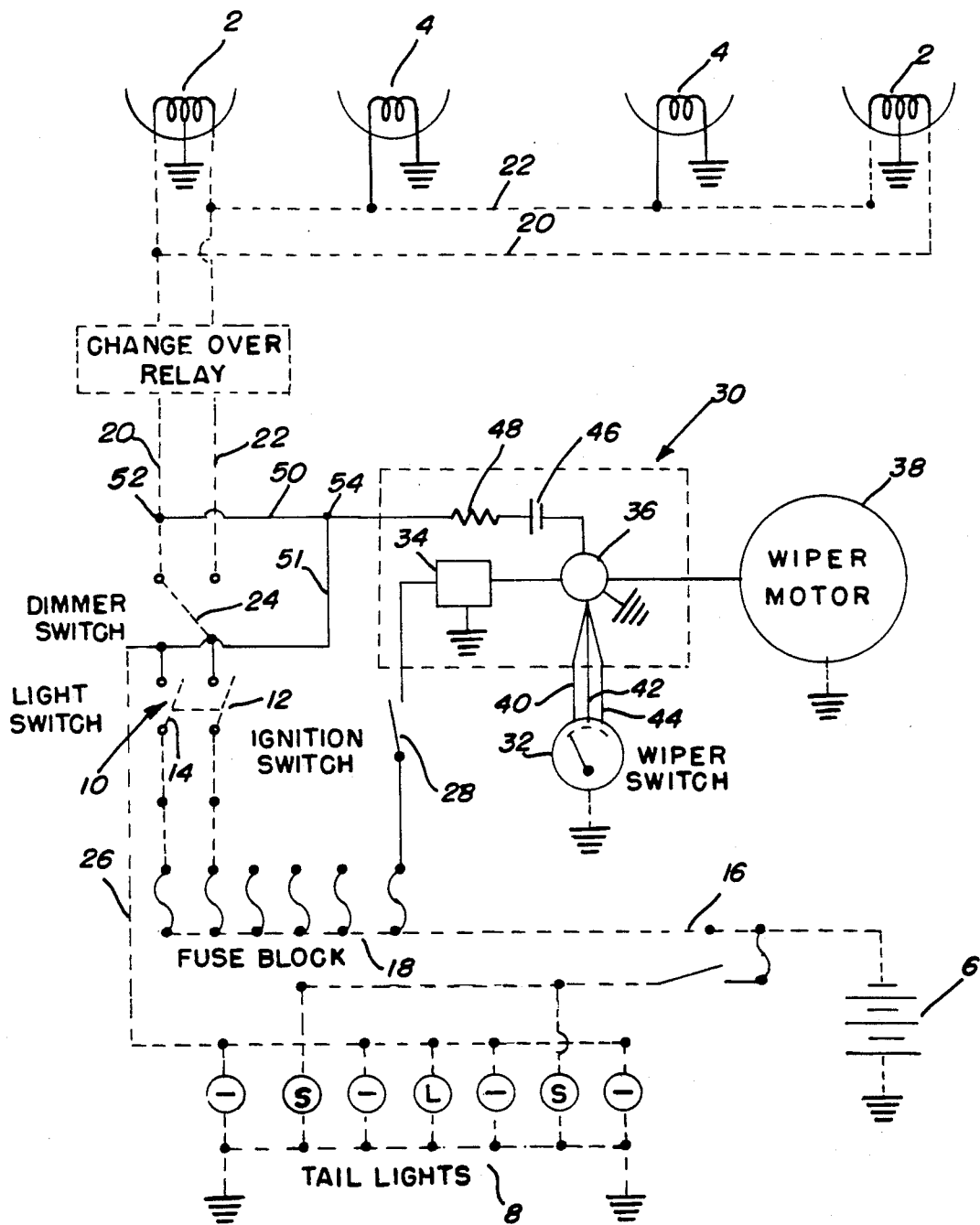
FIG. 1 is a schematic of a wiring circuit of a vehicle driving light system and a windshield wiper system combination.

Referring to the drawing, FIG. 1, there is shown a wiring system for controlling the driving lights and windshield wiper system. The conventional wiring is shown in broken lines; whereas the circuit shown in solid lines forms the invention. FIG. 1 shows headlights 2 having low beam and high beams, and headlights 4 having high beams. Electric current for operating headlights 2 and 4 is supplied by a 12 volt battery 6. Also, there are tail lights 8 operated by the battery. The headlight and taillight wiring by-passes the ignition so that the lights can be turned on without the ignition being on. A driving light switch 10 which is a double switch with headlight blade 12 and taillight blade 14 control the turning on and off under normal circumstances.

The battery 6 is connected by wire 16 to a fuse block 18, switch 10 is fused by fuse block 18. Wires 20 and 22 connect headlights 2 and 4 to switch 10. There is a dimmer control switch 24 between switch 10 and the headlights. Wire 26 connects taillights 8 via switch 10, fuse block 18 and wire 16 to battery 6.

Wired to the fuse block 18 is an ignition switch 28 that supplies current to a timer panel 30. A wiper switch 32 is also wired to timer panel 30. The ignition switch is wired to a relay 34 which connects to a timer 36, that in turn connects to a wiper motor 38. The wiper switch 32 is connected via leads 40, 42 and 44 to timer 36. With the ignition switch on current flows through relay 34 to timer 36. When wiper switch 32 is turned on, the timer 36 supplies current to wiper motor 38. Switch 32 signals timer 36 to operate fast, slow, or intermittent according to the rain conditions.

Headlights 2 receive current when the wiper switch 32 is turned on so that the vehicle complies with state laws governing driving in the rain. It is important to realize that the ignition switch 28 must also be on to provide current to the system. Current is carried from battery 6, fuse block 18 and relay 34 to timer 36. The current leaving timer 36 may be intermittent, therefore, a capacitor 46 and resistor 48 receive any intermittent current and supplies a steady current through line 50 to connection 52 on low beam power supply line 20, connected to low beam headlights 2.

Taillights 8 also turn on with the operation of wiper switch 32. Current for the taillights follow the same circuit as the headlight current, through capacitor 46 and resistor 48 to line 50 and connection 54. Line 56 runs from connection 54 to taillight line 26 sending current to the taillights.

Under normal driving, the relay 34 is energized when the ignition switch is closed to start the engine. However, the relay 34 is not operative until the wiper switch 32 is turned on. When switch 32 is turned fully on, the driving lights are energized along with the wiper motor 38. Likewise, when the wiper switch is turned on intermittently the driving lights are energized.

It is understood that the circuit showing the headlights, light switch and taillights do not form part of the invention, and that the invention is concerned with the circuit for operating the lights when the windshield wipers are operated. This includes operating the wipers fully or intermittently. It should be further understood that while only one embodiment of the invention has been shown that one skilled in the art may realize other embodiments and, therefore, one should study the drawing, description and claims for a complete understanding of the invention.

I claim:

1. In combination with an automobile electrical system including a source of voltage, an ignition switch, a headlight dimmer switch, a wiper motor, and at least one pair of head lights having a low beam circuit comprising:

a timer means and a wiper switch means energized by a source of voltage to operate said wiper motor, said timer means and said wiper switch means having multiple operating levels to operate said wiper motor including fast, slow and intermittent, a means to continually energize said low beam headlight circuit through the multiple operating levels between said headlight and said timer means, and wherein said means to continually energize said low beam headlight circuit includes means to store and supply energy when needed and means to prevent energy surges to the headlight circuit.

2. The combination as in claim 1 wherein said means to store and supply energy when needed is a capacitor means, and said means to prevent energy surges to the headlight circuit is a resistor means.

3. The combination as in claim 1 wherein said means to continually energize said low beam headlight circuit is connected to the low beam headlight circuit to operate said circuit independently of said dimmer switch.

4. The combination as in claim 1 wherein said means to continually energize said low beam headlight circuit is connected to a taillight circuit to energize the taillight circuit with the headlight circuit.

5. The combination as in claim 1 wherein said means to continually energize said low beam headlight circuit is connected to the low beam headlight circuit to operate said circuit independently of said dimmer switch.

6. The combination as in claim 5 wherein said means to continually energize said low beam headlight circuit is connected to a taillight circuit to energize the taillight circuit with the headlight circuit.

* * * * *